(12) United States Patent
Palmlund et al.

(10) Patent No.: US 8,967,934 B1
(45) Date of Patent: Mar. 3, 2015

(54) BALE LOADING AND TRANSPORTING TRAILER SYSTEM

(75) Inventors: Matt Palmlund, Bancroft, SD (US);
Brian Schuelke, Lennox, SD (US);
Leroy Stumpe, Hartford, SD (US)

(73) Assignee: Sioux Steel Company, Sioux Falls, SD (US)

( * ) Notice: Subject to any disclaimer, the term of this patent is extended or adjusted under 35 U.S.C. 154(b) by 378 days.

(21) Appl. No.: 12/846,417

(22) Filed: Jul. 29, 2010

Related U.S. Application Data

(60) Provisional application No. 61/230,480, filed on Jul. 31, 2009.

(51) Int. Cl.
*A01D 90/08* (2006.01)

(52) U.S. Cl.
USPC .......................................................... 414/111

(58) Field of Classification Search
USPC ............... 414/111, 132, 24.5, 24.6, 522, 551, 414/552, 554, 789.4, 525.1, 790.3, 791.6, 414/792.6; 198/370.02, 468.1, 468.11, 198/468.7, 750.2, 750.5, 772; 298/18
See application file for complete search history.

(56) References Cited

U.S. PATENT DOCUMENTS

| | | | | |
|---|---|---|---|---|
| 408,799 A | * | 8/1889 | Dwelley | 414/435 |
| 1,225,004 A | * | 5/1917 | Black | 414/522 |
| 1,316,195 A | * | 9/1919 | Scheunemann | 414/522 |
| 2,653,052 A | * | 9/1953 | Van Pelt et al. | 298/18 |
| 3,995,894 A | * | 12/1976 | Bishop | 298/10 |
| 4,253,786 A | | 3/1981 | Harkness | |
| 4,259,034 A | * | 3/1981 | Ward et al. | 414/24.6 |
| 4,329,102 A | | 5/1982 | Gray | |
| 4,441,845 A | | 4/1984 | Gibson | |
| 4,500,242 A | * | 2/1985 | Beikman | 414/24.5 |
| 4,621,776 A | * | 11/1986 | Hostetler | 241/101.76 |
| 4,630,986 A | | 12/1986 | Taylor | |
| 4,789,289 A | * | 12/1988 | Wilson | 414/24.6 |

(Continued)

FOREIGN PATENT DOCUMENTS

| | | | | |
|---|---|---|---|---|
| DE | 3213196 A1 | * | 10/1983 | A01D 90/08 |
| EP | 79315 A1 | * | 5/1983 | A01D 90/08 |
| FR | 2620300 A1 | * | 3/1989 | A01D 90/00 |

OTHER PUBLICATIONS

Webpage: Tubeline bale wagons, accessible at http://www.tubeline.ca/Products/Technobale/ available on the web as of Dec. 19, 2008; accessed on Dec. 8, 2011. Website details a lift frame having main, medial and tip portions.*

*Primary Examiner* — Gregory Adams
(74) *Attorney, Agent, or Firm* — Jeffrey A. Proehl; Woods, Fuller, Shultz & Smith, PC

(57) ABSTRACT

A bale loading and transporting trailer apparatus comprises a transport assembly having wheels, and a bale support frame on the transport assembly to support the bale support frame above the ground surface. The bale support frame is movable with respect to the transport assembly between a load condition for supporting bales and a dump condition for rolling bales off of the bale support frame. A lift frame is configured to lift a bale positioned adjacent to the bale support frame onto the support frame. A bale shifting assembly is configured to shift a bale rearwardly from a load position on the bale support frame to a store position behind the load position. The bale shifting assembly may include a sled movable in a longitudinal direction on the bale support frame to carry a bale positioned thereon along the bale support frame.

8 Claims, 9 Drawing Sheets

(56) References Cited

U.S. PATENT DOCUMENTS

| | | | |
|---|---|---|---|
| 4,909,694 A | 3/1990 | Peters | |
| 4,938,646 A | 7/1990 | Elias | |
| 5,062,757 A * | 11/1991 | Eichenauer | 414/24.5 |
| 5,340,259 A | 8/1994 | Flaskey | |
| 5,630,689 A | 5/1997 | Willis | |
| 5,700,124 A | 12/1997 | Dufraisse | |
| 5,725,346 A | 3/1998 | Davina | |
| 5,730,572 A | 3/1998 | Scheuren | |
| 5,769,587 A | 6/1998 | Gilfoil | |
| 5,899,652 A * | 5/1999 | Graham | 414/24.5 |
| 6,935,827 B2 | 8/2005 | Delaurier | |
| 7,004,706 B1 | 2/2006 | Wilson | |
| 7,252,190 B2 | 8/2007 | Priepke | |
| 2004/0062626 A1 | 4/2004 | Delaurier | |
| 2006/0099060 A1 | 5/2006 | Eastwood | |
| 2007/0059126 A1 | 3/2007 | MacLay | |

\* cited by examiner

BALE LOADING AND TRANSPORTING TRAILER SYSTEM

RELATED APPLICATIONS

This application claims priority to and the benefit of: U.S. Provisional Patent Application Ser. No. 61/230,480, by Matt Palmlund, titled "BALE LOADING AND TRANSPORTING TRAILER SYSTEM" filed Jul. 31, 2009, which is incorporated herein by reference in its entirety

BACKGROUND

Field

The present disclosure relates to trailers and more particularly pertains to a new bale loading and transporting trailer system for moving baled material from one location to another location.

SUMMARY

The present disclosure describes a new bale loading and transporting trailer system which may be utilized for providing an easily used and economically constructed manner of moving baled material from one location to another location in a relatively quick operation.

The present disclosure relates to a bale loading and transporting trailer that may comprise a transport assembly for moving across a ground surface, a bale support frame that is configured to support a plurality of bales and is tiltably mounted on the transport assembly, an actuation assembly configured to cause tilting of the bale support frame with respect to the transport assembly, a hitch assembly located at the front end of the bale support frame, a lift frame configured to lift a bale positioned adjacent to the bale support frame onto the bale support frame, and a bale shifting assembly configured to shift a bale from a load position on the bale support frame to a store position behind the load position.

In another aspect of the disclosure, a bale loading and transporting trailer apparatus may comprise a transport assembly having wheels for moving across a ground surface. A bale support frame may be configured to support a plurality of bales, with the transport assembly supporting the bale support frame above the ground surface. The bale support frame may be elongated with a longitudinal axis and opposite front and rear ends. The bale support frame may be movable with respect to the transport assembly between a load condition configured to support bales on the bale support frame and a dump condition configured to roll any bales on the bale support frame off of the bale support frame. A lift frame may be configured to lift a bale positioned adjacent to the bale support frame onto the bale support frame into a load position, and the lift frame may be pivotally movable with respect to the bale support frame to move a bale on the ground surface into the load position. A bale shifting assembly may be configured to shift a bale in the load position rearwardly on the bale support frame to a store position behind the load position such that any bale in the stored position contacted by the bale in the load position is moved in a rearward direction of the bale support frame. The bale shifting assembly may include a sled movable in a longitudinal direction on the bale support frame to carry a bale positioned thereon along the bale support frame.

In yet another aspect of the disclosure, a bale loading and transporting trailer apparatus may comprise a transport assembly having wheels for moving across a ground surface. A bale support frame may be configured to support a plurality of bales, with the transport assembly supporting the bale support frame above the ground surface. The bale support frame may be elongated with a longitudinal axis and opposite front and rear ends. The bale support frame may be movable with respect to the transport assembly between a load condition configured to support bales on the bale support frame and a dump condition configured to roll any bales on the bale support frame off of the bale support frame. A lift frame may be configured to lift a bale positioned adjacent to the bale support frame onto the bale support frame into a load position, and the lift frame may be pivotally movable with respect to the bale support frame to move a bale on the ground surface into the load position. A bale shifting assembly may be configured to shift a bale in the load position rearwardly on the bale support frame to a store position behind the load position such that any bale in the stored position contacted by the bale in the load position is moved in a rearward direction of the bale support frame. The lift frame may comprise a primary arm extending outwardly from the bale support frame and being pivotable with respect to the bale support frame, with the primary arm having an inboard end and an outboard end. A pair of lift arms may be mounted on the primary arm and may extend away from the primary arm in substantially the same direction for positioning below a bale resting on a ground surface to be lifted. Mounting structure may mount the lift frame to the bale support frame is offset in a rearward direction on the bale support with respect to a location of the lift arms.

In still another aspect of the disclosure, a bale loading and transporting trailer apparatus may comprise a transport assembly having laterally-spaced wheels for moving across a ground surface, and having a central fore-aft axis positioned centrally between the laterally-space wheels. A bale support frame may be configured to support a plurality of bales, with the transport assembly supporting the bale support frame above the ground surface. The bale support frame may be elongated with a longitudinal axis and opposite front and rear ends, and the bale support frame may be movable with respect to the transport assembly between a load condition configured to support bales on the bale support frame and a dump condition configured to roll any bales on the bale support frame off of the bale support frame. A lift frame may be configured to lift a bale positioned adjacent to the bale support frame onto the bale support frame into a load position. The lift frame may be pivotally movable with respect to the bale support frame to move a bale on the ground surface into the load position. The bale support frame may be mounted in a laterally offset position on the transport assembly such that the longitudinal axis of the bale support frame is laterally offset from the central fore-aft axis of the transport assembly.

There has thus been outlined, rather broadly, some of the more important elements of the disclosure in order that the detailed description thereof that follows may be better understood, and in order that the present contribution to the art may be better appreciated.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the disclosure be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
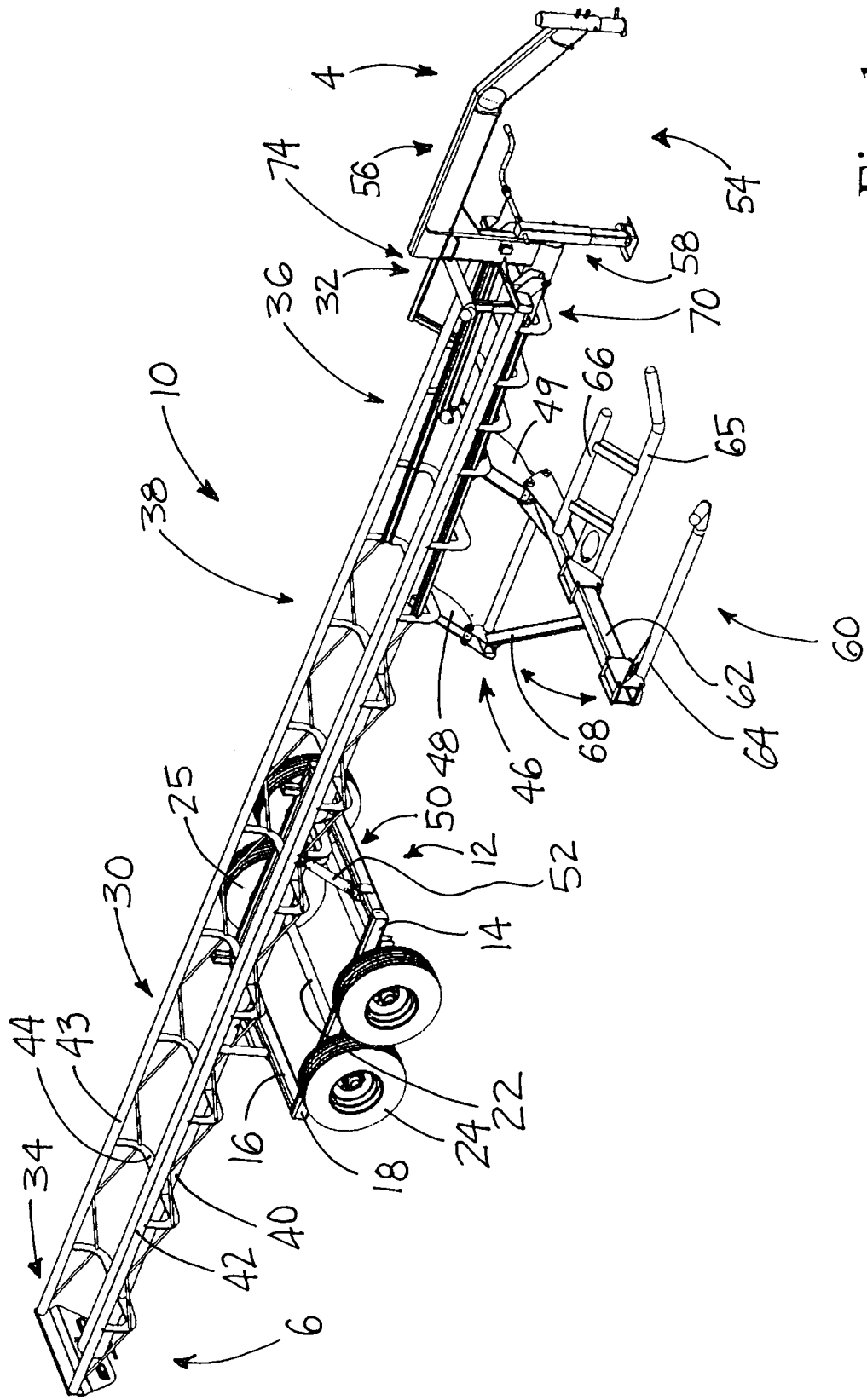
FIG. 1 is a schematic perspective view of the new trailer system according to the present disclosure, and particularly showing the bale support frame in the load condition, the lift frame in the lowered position, and the sled of the bale shifting assembly in the home position.
Figure 2:
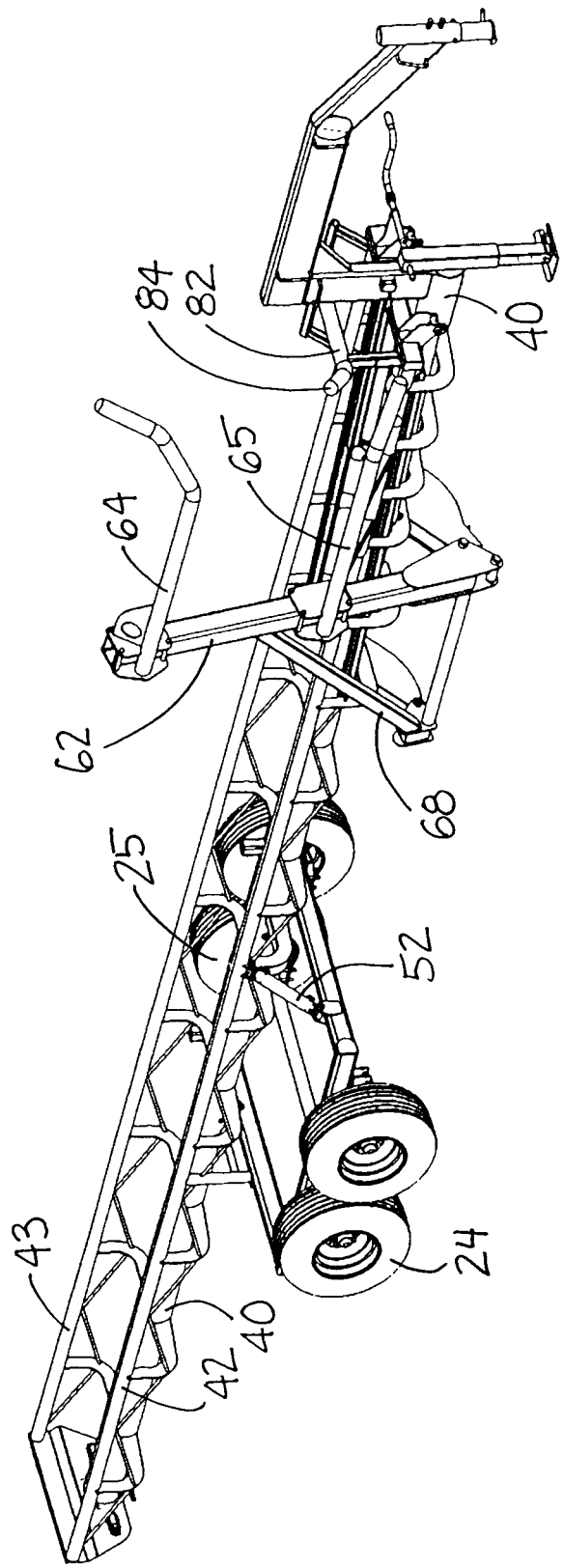
FIG. 2 is a schematic perspective view of the trailer system, according to an illustrative embodiment, and particularly showing the bale support frame in the load condition, the lift frame in the raised position, and the sled of the bale shifting assembly in the home position.

With reference now to the drawings, and in particular to FIGS. 1 through 9 thereof, a new bale loading and transporting trailer system embodying the principles and concepts of the disclosed subject matter will be described.

The present disclosure relates to a bale loading and transporting trailer system 10 with unique combinations and arrangements of features that provide significant benefits to the user, in terms of providing a relatively lightweight trailer that is able to carry more cargo, requires less power to tow, and is able to be pulled at highways speeds of up to and exceeding 50 miles per hour. The trailer system 10 may also provide a trailer that is relatively easily operated for loading and transporting bales by a single person without requiring additional vehicles to load and unload the trailer, or requiring the operator to leave the vehicle to operate the additional vehicles. Further, the trailer system 10 includes features that permit the trailer to be towed with a conventional pickup truck.

The trailer system 10 is suitable for use with materials assembled into bales 1, especially bales that have a substantially cylindrical shape, although the usefulness of the trailer may extend beyond this type and configuration of cargo to other types and configurations of cargo. The trailer system is configured in a manner so that it is suitable for being pulled behind a vehicle 2, such as a pickup truck or a tractor.

The bale loading and transporting trailer system 10 may generally be elongated with a front end 4 and a back end 6, and a longitudinal axis 8 that extends between the front and back ends. The trailer system 10 may include a transport assembly 12 for moving across a ground surface, such as the surface of an agricultural field or a road or highway. The transport assembly 12 may be located along the longitudinal axis 8 of the trailer system at a location that is spaced from the front end 4 and the rear end 6, and may be substantially centrally located between the front and rear ends.

In greater detail, and such as is shown in the illustrative embodiments of the drawings, the transport assembly 12 may comprise a transport frame 14 that includes a plurality of transverse members 16 and a plurality of longitudinal members 18 that join the transverse members. The transport frame 14 may have a central longitudinal axis 20 (see FIG. 6) that is substantially centrally located between the furthest lateral extents of the trailer frame 14. The transport assembly 12 may further comprise at least one axle 22, and preferably includes a pair of axles 22 that are mounted on the transport frame 14. A pair of wheels 24, 25 may be mounted on opposite ends of each of the axles 22. The axles 22 extend transverse to the longitudinal axis 8 of the trailer system 10.

The trailer system 10 may also include a bale support frame 30 that is configured to support a plurality of bales, and suitably supports one or more bales in an end to end orientation with the central axes of the cylindrical bales being aligned and parallel to the longitudinal axis 8 of the trailer system 10. The bale support frame 30 may be elongated with a front end 32 and a rear end 34, and a longitudinal axis that is oriented parallel to the longitudinal axis 8. Any number of bales may be supported on the frame 30 between the ends 32, 34, but a capacity of between five and ten bales is desirable.

The bale support frame 30 is mounted on the transport assembly 12, and the transport assembly 12 thus supports the support frame 30 in a position above the ground surface. Significantly, the bale support frame 30 may be movable with respect to the transport assembly 12 between a load condition (see FIG. 1) that is configured to securely support bales on the bale support frame, and a dump condition (see FIG. 4) that is configured to cause any bales resting upon the bale support frame to roll off of the support frame 30 to the side of the support frame in a side dump fashion. The bale support frame 30 may be laterally tipped from the load condition to the dump condition. To achieve the movement between the load and dump conditions, the bale support frame 30 may be pivotally mounted on the transport assembly 12 to permit the tipping or tilting of the bale support frame with respect to the transport assembly. The bale support frame 30 may be pivotable with respect to the transport assembly about a tip axis that is oriented substantially parallel to the longitudinal axis 8 of the trailer system 10, and thus the tip axis may be substantially horizontal axis in orientation.

In one significant aspect of the trailer system 10, the bale support frame 30 may be mounted in a laterally offset position on the transport assembly 12, such that the bale support frame is located lateral to the central longitudinal axis 20 of the trailer frame 14. The bale support frame 30 may thus be located closer to one wheel 25 of the pair of wheels on an axle than the other wheel 24 on the axle. This feature may provide balance in the trailer system 10 for the weight of a bale as it is being lifted onto the bale support frame, particularly when the first bale is being loaded onto an unloaded bale support frame, and there are no bales on the support frame to provide additional downward force on the support frame.

The bale support frame 30 may have a load position 36 which is the position at which a bale is initially placed upon the bale support frame when loaded on the support frame. The load position may be located at the foremost position for a bale on the bale support frame, and the position closest to the front end 32 of the support frame. The bale support frame may also have at least one store position 38 which is located rearwardly on the bale support frame of the load position 36 for bales that have previously been loaded onto the frame 30. Thus, the forwardmost position that a bale may have on the bale support frame may be the load position 36, and each position rearward of the load position may be considered a store position. In another significant aspect of the system 10, tipping or tilting of the bale support frame 30 from the load condition to the dump condition may unload all bales in the load 36 and storage 38 positions substantially simultaneously and at the same time, rather than, for example, being unloaded or dumped one at a time in a serial fashion.

In greater detail, an illustrative embodiment of the bale support frame 30 may comprise a spine 40 that extends in the longitudinal direction of the bale support frame, and which has a forward end generally corresponding to the front end 32 of the support frame and a rearward end generally corresponding to the rear end 34 of the support frame. The bale support frame 30 may also include a pair of support rails 42, 43 that are positioned on opposite lateral sides of the spine 40, and may each be oriented substantially parallel to the spine. The bale support frame 30 may further include a plurality of cross members 44 connecting the support rails 42, 43 to the spine 40 to thereby support the rails on the spine. It should be recognized that other configurations for the bale support frame may be employed, although the disclosed configuration has been found to be highly suitable for the purpose of supporting the bales.

The support rails 42, 43 may be located at a relatively higher vertical level than the spine with respect to the ground surface such that a bale resting on the support frame 30 primarily rests upon the support rails, and not the spine, but this relationship is not critical. The load condition of the bale support frame 30 may be characterized by the support rails 42, 43 being positioned at substantially the same vertical level as each other, while the dump condition my be characterized by one 43 of the support rails being positioned at a lower vertical level than the other one 42 of the support rails.

The bale support frame 30 may also comprise a lift mounting base 46 for supporting the lift frame 60 which is described in greater detail below. The lift mounting base 46 may be mounted on the spine 40, and may include a pair of mounts 48, 49 that extend in a lateral direction from the spine 40. Each of the mounts 48, 49 has an outer end, and the mounts may be located rearwardly on the support frame 30 of the load position 36.

The trailer system 10 may further include an actuation assembly 50 configured to cause pivoting or tipping of the bale support frame 30 with respect to the transport assembly 12. The actuation assembly 50 may comprise a telescopic actuator 52 that is connected to the support frame 30 and the transport frame 14 such that extension of the telescopic actuator causes the bale support frame to pivot and tip from the load condition to the dump condition. Retraction of the actuator causes movement of the support frame 30 back toward the load condition. In some embodiments, the actuation assembly 50 may comprise a hydraulic cylinder and rod, although other types of actuators may be employed, telescopic or not.

The trailer system 10 may further include a hitch assembly 54 located toward or at the front end 32 of the bale support frame. The hitch assembly 54 may be mounted to the spine 40. Significantly, the hitch assembly 54 may be substantially rigidly connected to the bale support frame 30 such that the hitch assembly moves with the bale support frame when the support frame is pivoted and tipped from the load condition to the dump condition.

In greater detail, in the illustrative embodiment the hitch assembly 54 comprises a gooseneck hitch arm 56 that is configured to attach to a hitch ball mounted on a vehicle. The gooseneck hitch arm 56 may include a substantially vertical jack portion, a substantially horizontal intermediate portion, and a substantially vertical forward portion. In the illustrative embodiments, the intermediate portion includes an inclined section as well as a substantially horizontal section. Use of the gooseneck type hitch allows the hitch assembly to tilt with the support frame 30, while remaining connected to the towing vehicle. Optionally, when other types of hitch connections are utilized, the hitch assembly may include portions that pivot with respect to each other so that one portion may remain stationary with the vehicle while another portion of the hitch tilts or pivots with the support frame 30.

The hitch assembly 54 may also comprise a trailer jack 58 configured to selectively engage the ground surface to support the gooseneck hitch arm 56 in a position above the ground surface. The trailer jack is extendable downwardly from the gooseneck hitch arm to engage the ground surface and is retractable to disengage from the ground surface, such as for highway travel.

The trailer system 10 may also include a lift frame 60 that is configured to lift a bale which is positioned adjacent to the bale support frame 30 onto the support frame. The lift frame 60 may be movable with respect to the support frame between a lowered position (see FIG. 1) that is adjacent to the ground surface, and a raised position (see FIG. 2) above the ground surface and adjacent to the support frame that permits the bale to roll or fall to the support frame under the influence of gravity. In the illustrative embodiments, the lift frame 60 is pivotally connected to the bale support frame, and may be positioned with respect to the support frame so as to place a bale into the load position 36 on the support frame.

In greater detail, an illustrative embodiment of the lift frame 60 comprises a primary arm 62 that extends outwardly from the bale support frame 30, and may be pivotally mounted on the support frame to permit pivot movement of the arm with respect to the frame 30. The primary arm 62 has an inboard end and an outboard end, and the inboard end may be mounted on the support frame 30 and the outboard end is free to move with respect to the frame 30. In the illustrative embodiments, the inboard end is mounted on the foremost mount 49 of the lift mounting base 46.

The lift frame 60 may also have a pair of lift arms 64, 65 for positioning below a bale to be lifted. The lift arms 64, 65 may be mounted on the primary arm 62 and may extend away from the primary arm in substantially the same direction. The lift arms 64, 65 may be spaced from each other, and the distance between the arms may be adjustable. The outermost one 64 of the lift arms may have a main portion 64*a* that extends substantially perpendicular to the primary arm, a medial portion 64*b* that extends at an angle to the main portion, and a tip portion 64*c* that extends at an angle to the medial portion. The innermost lift arm 65 has a main portion and a medial portion, with the main portion of the outermost lift arm and the main portion of the innermost lift arm being oriented substantially parallel to each other. The medial portions of the outermost 64 and innermost 65 lift arms may extend in divergent directions with respect to each other to facilitate the insertion of the bale between the arms 64, 65 as the lift frame is moved toward the bale resting on the ground surface in a field. The tip portion of the outermost arm 64 may be angled to permit the tip portion to be used to engage and turn a bale as it lies in the field for proper alignment with the lift frame. An auxiliary support 66 may be mounted on the innermost lift arm 65 and may extend toward the bale support frame 30 to support a bale situated on the lift frame when the lift frame is being moved from the lowered position to the raised position, so that the bale does not prematurely fall from the lift assembly and as a result not reach the load position on the support frame.

The lift frame 60 may further include a support beam 68 that extends between one 48 of the mounts of the lift mounting base and a location on the primary arm 62. The support beam 68 may be mounted to the primary arm at a location that is spaced from the inboard end of the primary arm, and that location may be closer to the outboard end of the primary arm than the inboard end of the primary arm. The support beam acts to counter twisting forces on the primary arm when the bale is lifted, as well as permitting one of the mounts to be located rearwardly of the primary arm and the lift arms.

A bale shifting assembly 70 of the trailer system 10 may be configured to shift a bale from the load position 36 on the bale support frame to the store position 38 behind the load position, thereby moving any bale in the foremost store position to a store position that is further back on the support frame 30. The bale shifting assembly 70 may push a bale in the load position in a rearward direction, as well as any bales contacted by the bale being pushed by the bale shifting assembly.

Figure 3:
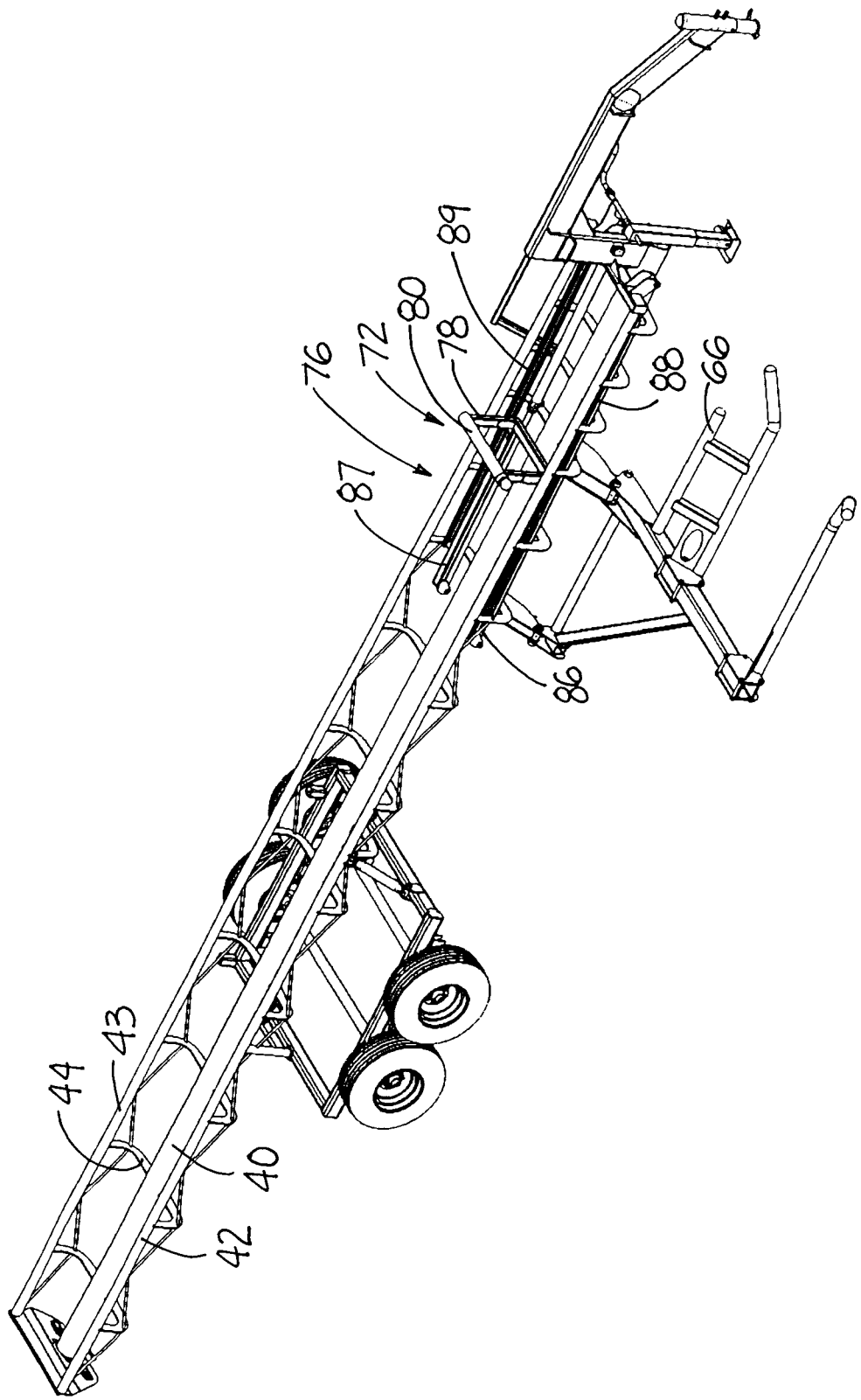
FIG. 3 is a schematic perspective view of the trailer system, according to an illustrative embodiment, and particularly showing the bale support frame in the load condition, the lift frame in the lowered position, and the sled of the bale shifting assembly in the push position.
Figure 4:
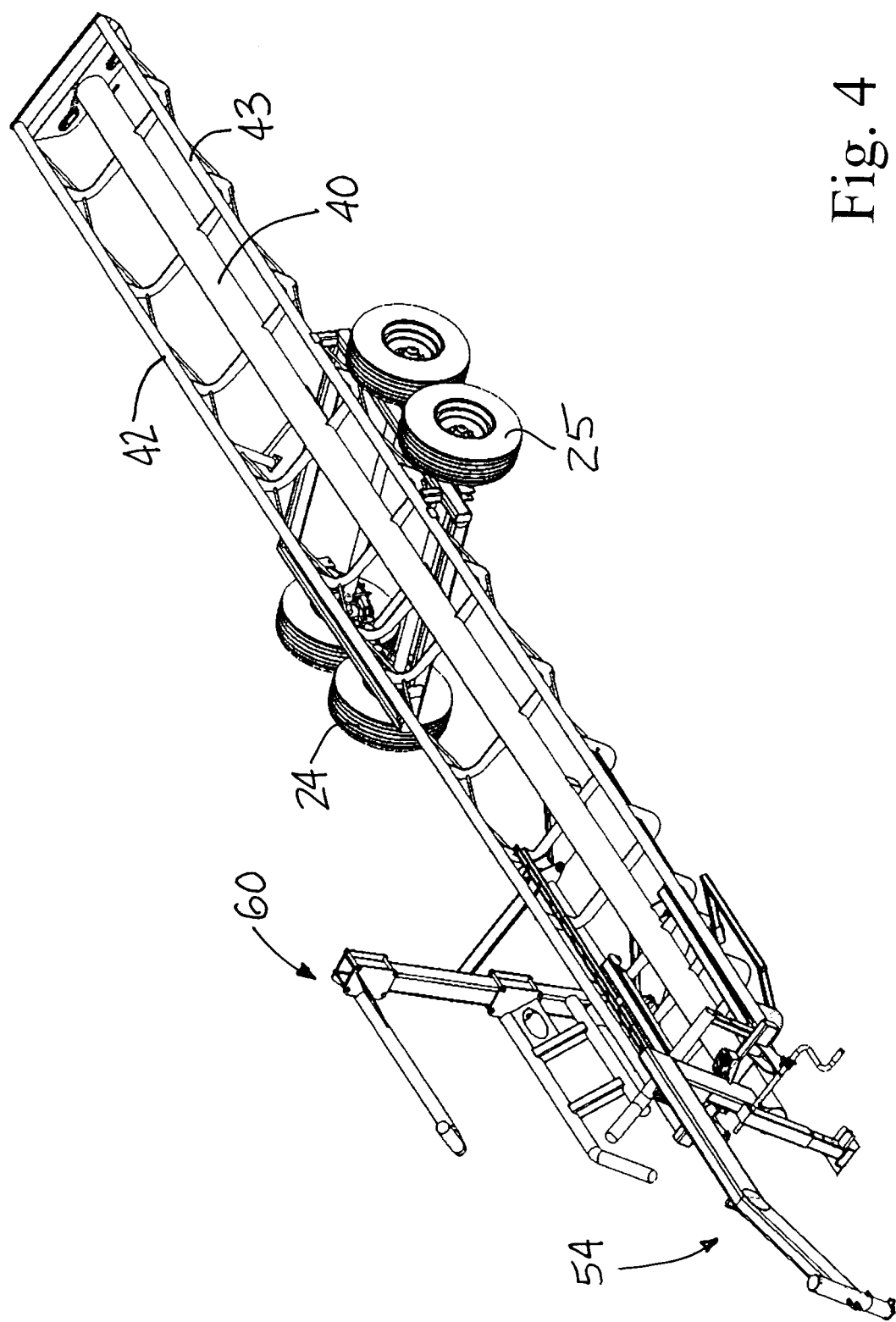
FIG. 4 is a schematic perspective view of the trailer system, according to an illustrative embodiment, and particularly showing the bale support frame in the dump condition, the lift frame in the raised position, and the sled of the bale shifting assembly in the home position.
Figure 5:
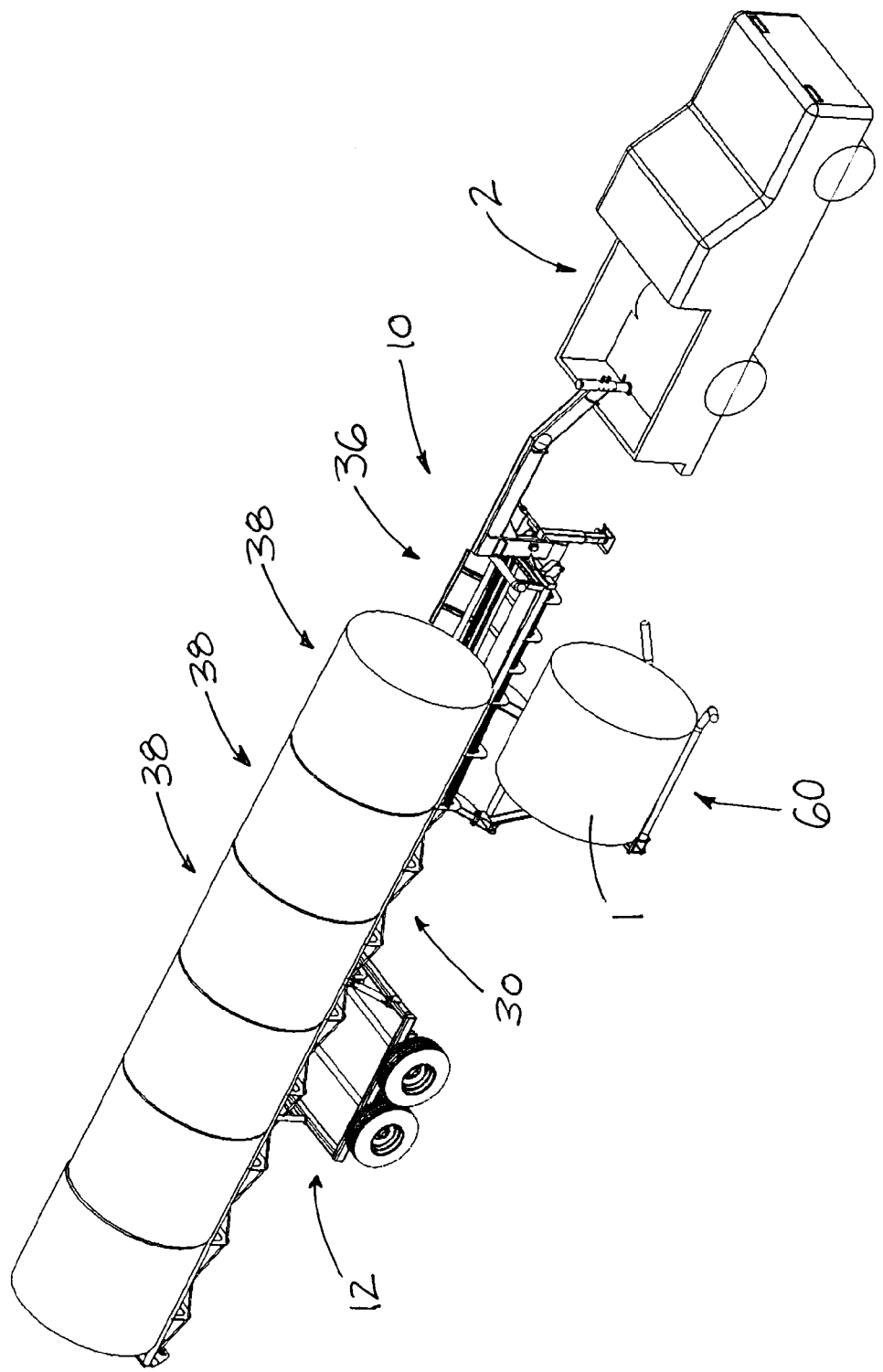
FIG. 5 is a schematic perspective view of the trailer system, according to an illustrative embodiment, and particularly showing the bale support frame being loaded with a plurality of bales, as well as showing a bale being engaged with the lift frame and ready to be moved by the lift frame into the load position on the bale support frame.
Figure 6:
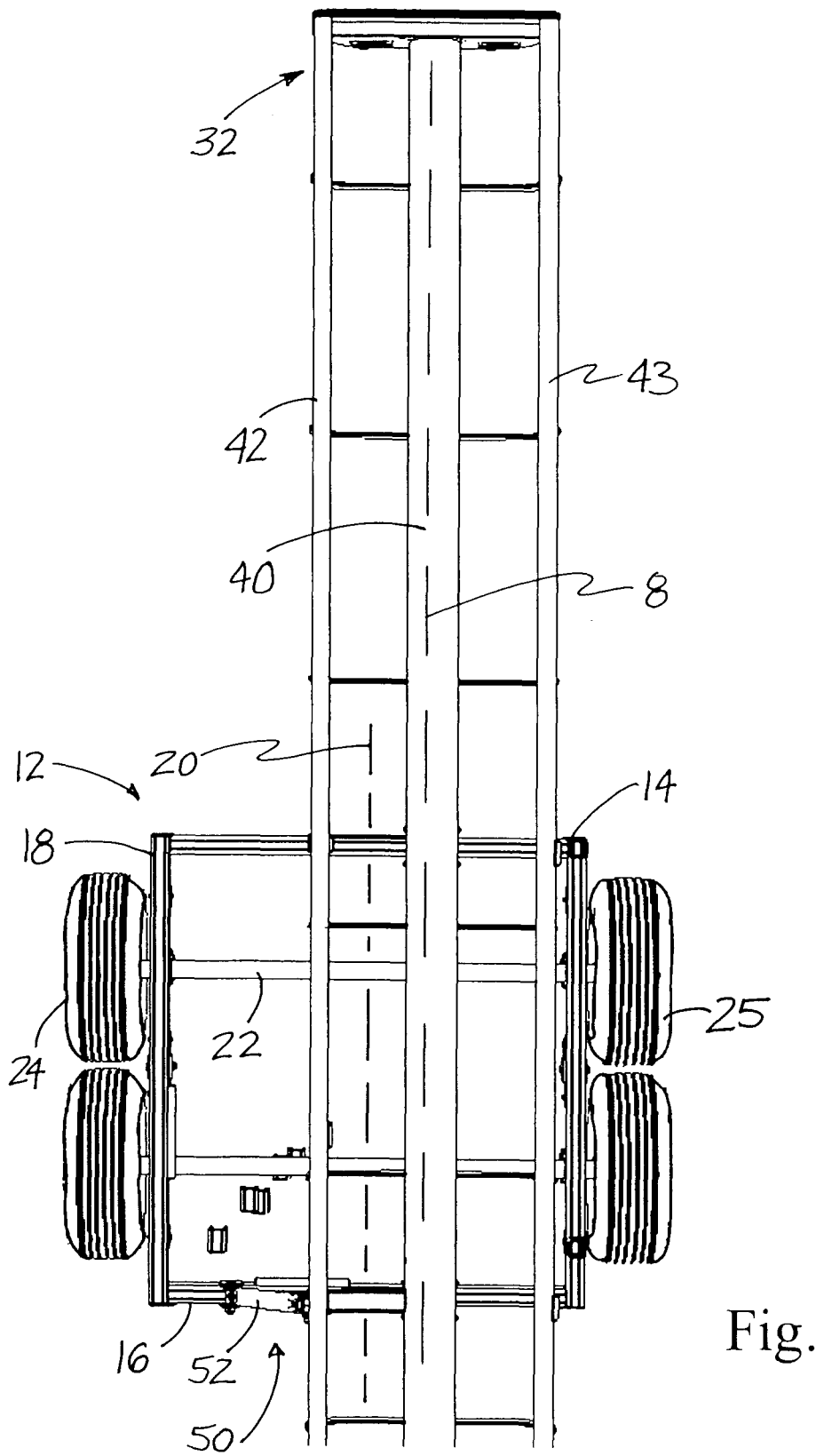
FIG. 6 is a schematic top view of a rear portion of the trailer system according to an illustrative embodiment.
Figure 7:
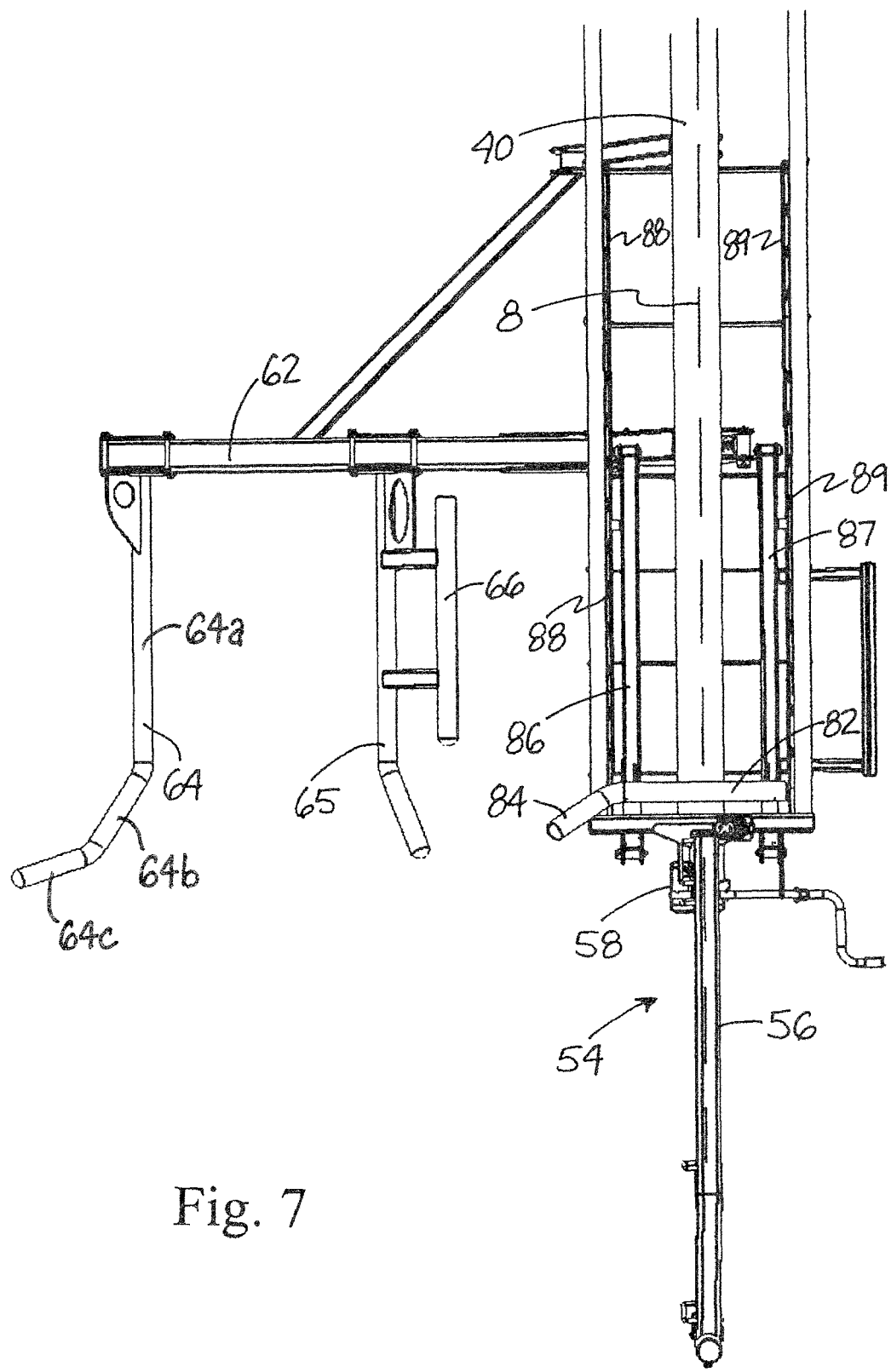
FIG. 7 is a schematic top view of a front portion of the trailer system according to an illustrative embodiment.
Figure 8:
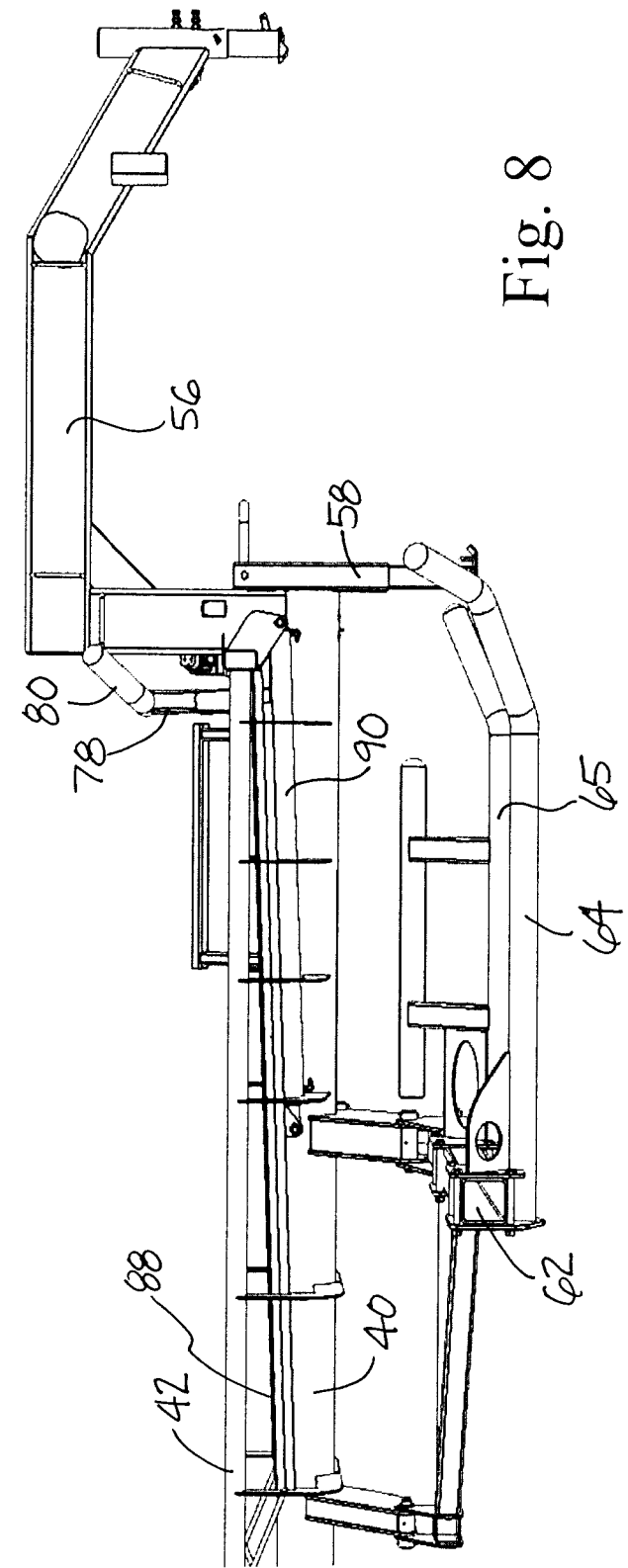
FIG. 8 is a schematic top view of a front portion of the trailer system according to an illustrative embodiment.
Figure 9:
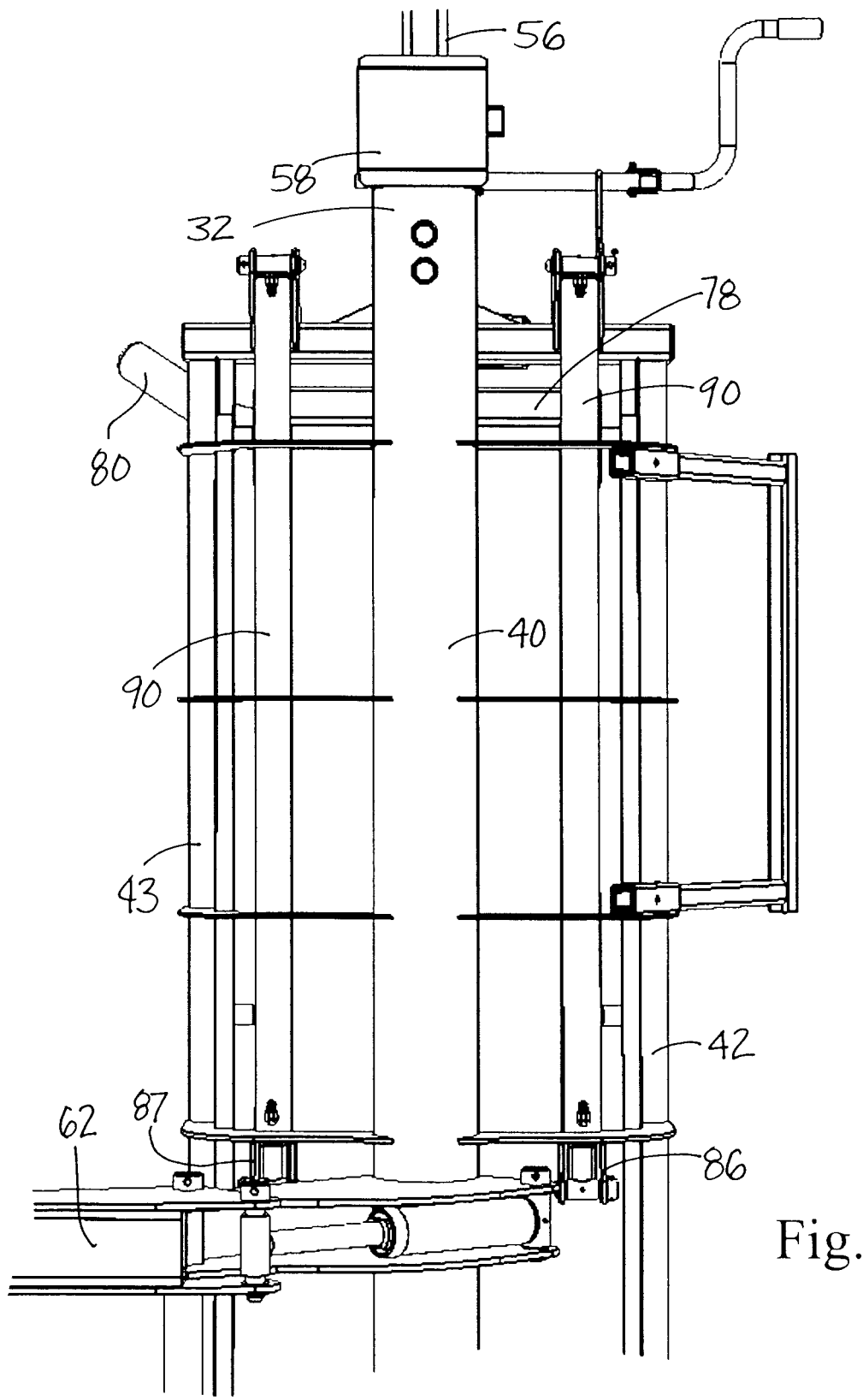
FIG. 9 is a schematic bottom view of a front portion of the trailer system according to an illustrative embodiment.

The bale shifting assembly 70 may comprise a sled 72 that is movable on the bale support frame 30 between a home position 74 (see FIG. 1) and a push position 76 (see FIG. 3). The sled 72 may be movable in a longitudinal direction of the bale support frame 30 between the positions. The home position 74 is located adjacent to the front end of the bale support frame, and the push position 78 is located rearwardly of the home position. The push position may be spaced from the home position a distance that is less than one-half of the length of the bale support frame, and may be less than one-third of the length of the support frame. The push position 78 may be spaced from the home position 76 by a distance that is approximately one bale width, or just slightly larger than one bale width. The push position may be spaced from the home position less than approximately 10 feet, and in some preferred embodiments, the push position is spaced from the home position approximately 70 inches.

In greater detail, the sled 72 may include a pusher structure 78 configured to contact a bale located in the load position 36, and at least a portion of the pusher structure may be located above the support rails 42, 43 of the bale support frame for this purpose. The pusher structure may include a pusher member 80 which may have a central portion 82 and a lateral end portion 84. Illustratively, the central portion 82 may be substantially horizontally oriented and the lateral end portion 84 may be inclined from the central portion. The lateral end portion 84 may be inclined upwardly and forwardly to help guide a bale moving into the load position on the support frame without becoming entangled with the pusher member. The sled 72 may further comprise a pair of longitudinal members 86 that extend from the pusher structure 80, and may be laterally spaced from each other. Each of the longitudinal members 86, 87 may have a first end that is connected to the pusher structure and a second end that is located opposite of the first end. The first end is located relatively closer to the front end 4 of the trailer system 10, and the second end is located relatively closer to the rear end 6 of the trailer system. The longitudinal members may extend below a bale positioned in the load position, and although the bale may not directly contact the longitudinal members, such contact may be implemented.

The bale shifting assembly 70 may further comprise a pair of sled guide rails 88, 89 that are configured to support and guide movement of the sled 72 between the home position 74 and the push position 76. Each of the sled guide rails 88, 89 may be mounted on the bale support frame 30, and may be laterally spaced from each other as well as being substantially parallel to each other. Each of the guide rails 88, 89 may be positioned adjacent to one of the support rails 42, 43 of the support frame. Rollers on each of the longitudinal members 86, 87 may ride on, otherwise be entrained upon, one of the sled guide rails 88, 89 to thereby guide movement of the sled. A pair of the rollers may be mounted on each longitudinal member, and the rollers may be longitudinally spaced along each of the members 86, 87.

Additionally, the bale shifting assembly 70 may include a sled moving assembly 90 that is configured to move the sled 72 between the home 74 and push 76 positions. The sled moving assembly 90 may be mounted on the bale support frame and may act on the sled to move the sled with respect to the bale support frame. Illustratively, the sled moving assembly may include at least one, and preferably a pair of, telescopic actuators that are connected to the support frame 30 and the pusher structure 80. Each of the telescopic actuators may be connected to one of the longitudinal members at the second end thereof, so that an actuator acts on each of the longitudinal members in a manner such that extension of the actuators causes the sled to move toward the push position, and retraction of the actuators causes the sled to move toward the home position.

The actions of the various actuators described herein, such as to tilt the bale support frame, pivot the lift frame, and move the sled, may be caused by the utilization of hydraulic fluid circuits, although those skilled in the art will recognize in view of this disclosure that other means may be used for causing these actions, including, but not limited to, electrically-powered actuators and pneumatically-powered actuators. Advantageously, a hydraulic power source is often integrated into the towing vehicle in the form of a power take-off from the driveline, such as in the case of a tractor, or may be readily carried by the vehicle in the form of a portable hydraulic power unit including a gas or electric motor and a hydraulic pump, such as in the case of a pickup truck. Control of the actuators, such as the through the hydraulic fluid circuits, may be accomplished by manual controls that control the flow of the fluid through the circuits. The controls may be mounted on some element of the trailer system, such as the hitch assembly, or may be remotely located, such as in the cab of the vehicle. The remote control may also be wirelessly linked to solenoids or other actuators that actuate the hydraulic control valves. The control of the various actions may optionally be automated so that the actuators act in an automatic and coordinated fashion, such as by automatically pivoting the lift frame from the lowered to raised position to place the bale in the load position, followed by moving the sled from the home position to the push position, without the user having to separately actuate the controls to cause the lifting and pushing actions.

Further, it will be appreciated that the concepts of the disclosure may be applied to bales that are not circular or cylindrical, and have, for example, a more cubic shape. Also, the elements of the concept may be scaled up or down, and may, for example, utilize multiple rows of bales on the bale support frame using one or more lift frames.

In one significant aspect of the trailer system 10, the bale support frame 30 may connect the transport assembly 12 to the hitch assembly 54, and thus may form the only mechanical connection between the transport assembly and the hitch assembly, without requiring any frame separate of the bale support frame to connect these structures. This arrangement provides a trailer system that is lighter in weight and easier to manufacture than trailers that employ a full frame that links the axles to the hitch in addition to a frame or bed for supporting the bales. In a further advantageous aspect, the lift frame is mounted on the bale support frame, rather than on a separate linking frame, and tips with the bale support frame when the bale support frame is tipped laterally about the tip axis. This arrangement further avoids any need for a heavy and expensive linking frame that is not required by the present trailer system.

Further, since the trailer system is capable of dumping the bales simultaneously from the side of the support frame 30, the bale shifting assembly needs to be movable along only a portion of the length of the bale support frame, enough to open the load position, rather than the bale shifting assembly having to move the entire length of the support frame so as to be able to eject bales serially from the end of the support frame. This arrangement further contributes to the light weight and inexpensiveness of the trailer system. The relatively lightweight character of the trailer system permits the system 10 to be easily pulled down a road at highway speeds of over 50 miles per hour, which is not possible with heavier bale carrying trailers.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

The invention claimed is:

1. A bale loading and transporting trailer apparatus comprising:
    a transport assembly having wheels for moving across a ground surface;
    a bale support frame configured to support a plurality of bales, the transport assembly supporting the bale support frame above the ground surface, the bale support frame being elongated with a longitudinal axis and opposite front and rear ends, the bale support frame being movable with respect to the transport assembly between a load condition configured to support bales on the bale support frame and a dump condition configured to roll any bales on the bale support frame off of the bale support frame;
    a lift frame configured to lift a bale positioned adjacent to the bale support frame onto the bale support frame into a load position, the lift frame being pivotally movable with respect to the bale support frame to move a bale on the ground surface into the load position; and
    a bale shifting assembly configured to shift a bale in the load position rearwardly on the bale support frame to a store position rearward of the load position such that any bale in the store position contacted by the bale in the load position is moved in a rearward direction of the bale support frame;
    wherein the bale shifting assembly includes a sled movable in a longitudinal direction on the bale support frame to carry a bale positioned thereon along the bale support frame, the sled including a pusher structure extending upwardly to push against a generally vertically extending surface of a bale in the load position and a support structure extending longitudinally below the load position to support a substantially horizontally extending surface of the bale in the load position, the support structure being connected to the pusher structure such that the pusher structure and the support structure of the sled move as a unit and the support structure maintains support of the bale as the pusher structure pushes the bale from the load position to the store position.

2. The apparatus of claim 1 wherein the sled is movable between a home position generally corresponding to the load position of a bale on the bale support frame and a push position generally corresponding to a position rearward of the home position.

3. The apparatus of claim 1 wherein the bale shifting assembly is movable along only a partial portion of a length of the bale support frame.

4. The apparatus of claim 1 wherein movement of the bale shifting assembly is limited to a range between a position proximate to the front end of the bale support frame to a position less than one-half of the length of the bale support frame.

5. The apparatus of claim 1 wherein the sled of the bale shifting assembly comprises a pusher structure with at least a portion thereof being located above the bale support frame for contacting a bale located in the load position of the bale support frame, and
    a pair of longitudinal members extending from the pusher structure longitudinally along the bale support frame for positioning below a bale when the bale is being pushed by the bale shifting assembly.

6. The apparatus of claim 5 wherein the bale shifting assembly comprises at least one sled guide rail mounted on the bale support frame for supporting and guiding movement of the sled between the home position and the push position.

7. The apparatus of claim 5 wherein the pusher structure of the sled includes a central portion and the lateral end portion that is inclined upwardly and forwardly from the central portion for guiding a bale moving into the load position on the support frame.

8. The apparatus of claim 1 wherein the bale shifting assembly comprises a sled moving assembly mounted on the bale support frame and acting on the sled to move the sled with respect to the bale support frame between the home and push positions.

* * * * *